United States Patent
Nakamura et al.

(10) Patent No.: US 7,019,074 B2
(45) Date of Patent: Mar. 28, 2006

(54) CURABLE COMPOSITION

(75) Inventors: Seigo Nakamura, Pasadena, TX (US); Takashi Hasegawa, Pasadena, TX (US)

(73) Assignees: Kaneka Corporation, Osaka (JP); Kaneka Texas Corporaiton, Pasadena, TX (US)

( * ) Notice: Subject to any disclaimer, the term of this patent is extended or adjusted under 35 U.S.C. 154(b) by 0 days.

(21) Appl. No.: 10/828,180

(22) Filed: Apr. 21, 2004

(65) Prior Publication Data
US 2004/0214950 A1    Oct. 28, 2004

Related U.S. Application Data

(60) Provisional application No. 60/464,651, filed on Apr. 23, 2003.

(51) Int. Cl.
*C08L 51/00*    (2006.01)
*C08L 53/02*    (2006.01)

(52) U.S. Cl. .................. 525/63; 525/92 F; 525/92 G

(58) Field of Classification Search ................. 525/72, 525/92 F, 92 G, 63
See application file for complete search history.

(56) References Cited

U.S. PATENT DOCUMENTS

| | | |
|---|---|---|
| 4,593,068 A | 6/1986 | Hirose et al. |
| 5,250,607 A | 10/1993 | Comert et al. |
| 5,391,610 A | 2/1995 | Comert et al. |
| 6,355,317 B1 | 3/2002 | Reid et al. |

*Primary Examiner*—Jeffrey Mullis
(74) *Attorney, Agent, or Firm*—Kenyon & Kenyon LLP

(57) ABSTRACT

A curable composition comprising (A) an organic polymer having a reactive silicon-containing group, and (B) a block copolymer containing in its molecule one soft segment and at least one hard segment having structural units of an aromatic vinyl monomer. The composition has an improved adhesive property to substrates to which conventional curable compositions comprising an organic polymer having a reactive silicon-containing group are hard to adhere, such as mortar, concrete, fluorocarbon resin coats, EPDM rubber sheet, polyvinyl chloride resin sheet and acrylic resin substrate.

8 Claims, No Drawings

CURABLE COMPOSITION

This application claims priority to U.S. provisional application No. 60/464,651 filed 23 Apr. 2003, the content of which is incorporated by reference.

BACKGROUND OF THE INVENTION

The present invention relates to a curable composition useful as sealing material, adhesive, injection material, putty and the like. The curable composition of the present invention exhibits a good adhesive property to substrates such as mortar and concrete, fluorocarbon resin, EPDM rubber, polyvinyl chloride resin and acrylic resin.

Organic polymers having at least one reactive silicon-containing group in the molecule are known to have the property that the reactive silicon-containing groups hydrolyzed by moisture form siloxane bonds so as to form crosslinkages, thus converting into rubbery cured products.

Of these polymers having a reactive silicon-containing group, those having a main chain skeleton substantially composed of polyoxyalkylene polymer or polyisobutylene have been already industrially produced and widely used for many applications such as sealing material, adhesive, injection material, putty, paint and the like.

However, curable compositions comprising the organic polymers having a reactive silicon-containing group have a problem that the adhesive property is low or peeling occurs when applied to portions which are in contact with mortar or concrete. The curable compositions are also known to have a poor adhesive property to substrates such as EPDM rubber sheet and polyvinyl chloride resin sheet which are used as waterproof sheet for roof, fluorocarbon resin-coated steel sheet used as building material or the like, and acrylic resin board.

In order to solve the problem, it is attempted to incorporate the curable compositions with, as an adhesion promoter, epoxy resins, phenol resins, alkyd resins, various silane coupling agents, alkyltitanate compounds, or polyisocyanate compounds. However, s sufficient adhesive property has not been achieved.

It is an object of the present invention to provide a curable composition which comprises an organic polymer having a reactive silicon-containing group and has a good adhesive property to substrates such as mortar, concrete, fluorocarbon resin coat, EPDM rubber sheet, polyvinyl chloride resin sheet and acrylic resin board.

This and other objects of the present invention will become apparent from the description hereinafter.

SUMMARY OF THE INVENTION

The present inventors have found that it is effective for solving the problem as mentioned above to incorporate an organic polymer having a reactive silicon-containing group with a block copolymer containing one soft segment and at least one hard segment in its molecule.

Thus, in accordance with the present invention, there is provided a curable composition comprising:

(A) an organic polymer having a reactive silicon-containing group, and (B) a block copolymer containing in its molecule one soft segment and at least one hard segment having structural units of an aromatic vinyl monomer.

Preferably, the main chain skeleton of the organic polymer (A) is a polyoxyalkylene polymer.

The soft segment in the block copolymer (B) is preferably at least one member selected from the group consisting of a polybutadiene, a polyisoprene, an ethylene-butylene copolymer, an ethylene-propylene copolymer and a polyisobutene, more preferably at least one member selected from the group consisting of an ethylene-butylene copolymer, an ethylene-propylene copolymer and a polyisobutene.

The number of soft segments per molecule in the block copolymer (B) is preferably 4 or less.

The proportions of the components (A) and (B) in the composition are preferably from 5 to 50 parts by weight of the component (B) per 100 parts by weight of the component (A).

Preferably, the curable composition of the present invention further contains, as a component (C), a plasticizer or an organic solvent, especially an aromatic or aliphatic plasticizer or an aromatic or aliphatic solvent.

The curable composition of the present invention has a good adhesive property also to substrates to which conventional curable compositions comprising an organic polymer having a reactive silicon-containing group are hard to adhere, e.g., mortar, concrete, fluorocarbon resin coat, EPDM rubber, polyvinyl chloride resin sheet and acrylic substrate, and it is applicable to various substrates as a sealing material, an adhesive, an injection material, a putty, a paint and the like.

DETAILED DESCRIPTION

The main chain skeleton of the organic polymer (A) having a reactive silicon-containing group used in the present invention is not particularly limited, and those having various main chain skeletons can be used in the present invention. The main chain skeleton includes, for instance, polyoxyalkylene polymers, hydrocarbon polymers, polyesters, (meth)acrylic ester homopolymers and copolymers, vinyl polymers, graft polymers, polysulfides, polyamides, polycarbonates and the like. The term "(meth) acrylic" as used herein denotes acrylic and/or methacrylic and, for instance, "(meth)acrylic acid" means acrylic acid and/or methacrylic acid.

Examples of the polyoxyalkylene polymers are, for instance, polyoxyethylene, polyoxypropylene, polyoxybutylene, polyoxytetramethylene, polyoxyethylene-polyoxypropylene copolymer, polyoxypropylene-polyoxybutylene copolymer, and the like.

Examples of the hydrocarbon polymers are, for instance, polyolefins, e.g., ethylene-propylene copolymer, polyisobutylene, isobutylene-isoprene copolymer, polychloroprene, polyisoprene, copolymers of isoprene or butadiene with acrylonitrile or an aromatic vinyl compound such as styrene, polybutadiene, and copolymers of isoprene or butadiene, acrylonitrile and an aromatic vinyl compound such as styrene; and hydrogenated polyolefins as obtained by hydrogenation of the polyolefins mentioned above.

Examples of the polyesters are, for instance, polycondensation products of a dibasic acid such as adipic acid and a glycol, ring-opening polymerization products of lactones, polyarylates obtained by polycondensation of an aromatic dicarboxylic acid such as terephthalic acid or isophthalic acid and a dihydric phenol such as bisphenol A, and the like.

Examples of the (meth)acrylic ester homopolymers and copolymers are polymers prepared by radical polymerization of acrylate and/or methacrylate monomers, typically alkyl acrylates and/or alkyl methacrylates, e.g., ethyl (meth) acrylate and butyl (meth)acrylate.

Examples of the vinyl polymers are polymers prepared by radical polymerization of vinyl monomers such as (meth) acrylic esters, vinyl acetate, acrylonitrile, aromatic vinyl compounds such as styrene, and the like.

Examples of the graft polymers are polymers prepared by graft-polymerizing vinyl monomers onto organic polymers.

Examples of the polyamides are, for instance, nylon 6 prepared by ring-opening polymerization of ε-caprolactam, nylon 66 prepared by polycondensation of hexamethylene diamine and adipic acid, nylon 610 prepared by polycondensation of hexamethylene diamine and sebacic acid, nylon 11 prepared by polycondensation of ε-aminoundecanoic acid, nylon 12 prepared by ring-opening polymerization of ε-aminolaurolactam, and copolymer nylons comprising at least two components selected from the nylons mentioned above.

Examples of the polycarbonates are, for instance, a polymer prepared by polycondensation of bisphenol A and carbonyl chloride.

These polymers constituting the main chain skeleton of the organic polymer (A) comprehend polymers containing, besides main component monomers, other monomers copolymerizable therewith. Known organic polymers having at least one reactive silicon-containing group can be used as the organic polymer (A) in the present invention.

Of the above-mentioned polymers constituting the main chain skeleton of the organic polymer (A), polyoxyalkylenes, hydrocarbon polymers, polyesters, (meth)acrylic ester (co)polymers and polycarbonates are preferable from the viewpoints of availability and easiness in production. Further, saturated hydrocarbon polymers such as polyisobutylene, hydrogenated polyisoprene and hydrogenated polybutadiene, polyoxyalkylene polymers and (meth)acrylic ester copolymers are particularly preferable from the viewpoint that they have a relatively low glass transition temperature and therefore the obtained cured products have a good low-temperature resistance. Polyoxyalkylene polymers are the most preferable from the viewpoints of good workability and high degree of freedom in compounding.

The organic polymer (A) may contain other components such as a urethane bond-containing component in its main chain skeleton so long as the effects of the present invention are not greatly impaired. Examples of the urethane bond-containing component are those obtained by reaction of polyisocyanate compounds, e.g., an aromatic polyisocyanate such as toluene diisocyanate, diphenylmethane diisocyanate or xylylene diisocyanate, and an aliphatic polyisocyanate such as isophorone diisocyanate or hexamethylene diisocyanate, with polyols having various types of the main chain skeletons as mentioned above.

The organic polymer (A) has at least one reactive silicon-containing group in its molecule. The reactive silicon-containing group in the organic polymer (A) is a group having a hydroxyl group or a hydrolyzable group, which bonds to the silicon atom, and being capable of crosslinking by forming siloxane bonds by a reaction accelerated by a silanol condensation catalyst. A representative reactive silicon-containing group is a group of the formula (1):

$$-(SiR^1{}_{2-b}X_bO)_m-SiR^2{}_{3-a}X_a \qquad (1)$$

wherein $R^1$ and $R^2$ may be the same or different and each is an alkyl group having 1 to 20 carbon atoms, a cycloalkyl group having 5 to 20 carbon atoms, an aryl group having 6 to 20 carbon atoms, an aralkyl group having 7 to 20 carbon atoms or a triorganosiloxy group of the formula: (R')$_3$SiO— in which R' is a monovalent hydrocarbon group having 1 to 20 carbon atoms and three R' groups may be the same or different, and if two or more $R^1$ or $R^2$ groups are present, they may be the same or different, X is hydroxyl group or a hydrolyzable group and if two or more X groups are present, they may be the same or different, a is 0, 1, 2 or 3, b is 0, 1 or 2, m is 0 or an integer of 1 to 19, and b in the m groups (SiR$^1{}_{2-b}$X$_b$O) may be the same or different, provided that a and b satisfy (a+Σb)≧1.

The hydrolyzable group is not particularly limited and may be known hydrolyzable groups. Examples of the hydrolyzable group are, for instance, a hydrogen atom, a halogen atom, an alkoxyl group, an acyloxy group, a ketoxymate group, an amino group, an amido group, an aminooxy group, a mercapto group, an alkenyloxy group, and the like. Of these groups, preferable are a hydrogen atom, an alkoxyl group, an acyloxy group, a ketoxymate group, an amino group, an amido group, an aminooxy group, a mercapto group and an alkenyloxy group. Alkoxyl groups are particularly preferable from the viewpoints of moderate hydrolyzability and easy handling.

One to three groups X, i.e., hydrolyzable groups and/or hydroxyl groups, can combine to one silicon atom, and it is preferable that (a+Σb) is from 1 to 5. When two or more groups X are included in a reactive silicon-containing group, they may be the same or different.

In particular, a reactive silicon-containing group of the formula (2):

$$-SiR^2{}_{3-a}X_a \qquad (2)$$

wherein $R^2$ and X are as defined above, and a is an integer of 1 to 3, is preferable from the viewpoint of availability.

Examples of $R^1$ and $R^2$ in the formulas (1) and (2) are, for instance, alkyl groups such as methyl group and ethyl group, cycloalkyl groups such as cyclohexyl group, aryl groups such as phenyl group, aralkyl groups such as benzyl group, and triorganosiloxy groups of the formula: (R')$_3$SiO— in which R' is methyl group or phenyl group. Of these, methyl group is particularly preferable.

Typical examples of the reactive silicon-containing group are, for instance, trimethoxysilyl group, triethoxysilyl group, triisopropoxysilyl group, dimethoxymethylsilyl group, diethoxymethylsilyl group, diisopropoxymethylsilyl group, and the like.

The introduction of a reactive silicon-containing group into the component (A) can be carried out by known methods, for example, by the following methods.

(a) An organic polymer having a functional group such as hydroxyl group in its molecule is reacted with an unsaturated organic compound having an active group reactive with the functional group to give an organic polymer having an unsaturated group; or a monomer to give an organic polymer is copolymerized with a monomer having an unsaturated group which does not participate in a polymerization reaction, e.g., ring opening copolymerization of an epoxide with an epoxide having an unsaturated group to give a polyoxyalkylene copolymer having an unsaturated group. The obtained organic polymer is hydrosilylated by reacting it with a hydrosilane having a reactive silicon-containing group.

(b) An organic polymer having an unsaturated group prepared in the same manner as in the method (a) is reacted with a compound having both mercapto group and a reactive silicon-containing group, and (c) An organic polymer having a functional group such as hydroxyl group, epoxy group or isocyanate group is reacted with a compound having both a reactive silicon-containing group and a functional group reactive with the functional group of the organic polymer.

Of these methods, the method (a), and the method (c) wherein an organic polymer having a terminal hydroxyl group is reacted with a compound having both an isocyanate group and a reactive silicon-containing group, are preferable since a high conversion is achieved in a relatively short reaction time. The method (a) is particularly preferable, since the organic polymers having a reactive silicon-containing group prepared by the method (a) provide curable compositions having a lower viscosity and a better workability than those prepared by the method (c) and since the organic polymers prepared by the method (b) have a strong odor caused by mercaptosilane.

Examples of the hydrosilane compound used in the method (a) are, for instance, a halogenated silane such as trichlorosilane, methyldichlorosilane, dimethylchlorosilane or phenyldichlorosilane; an alkoxysilane such as trimethoxysilane, triethoxysilane, methyldiethoxysilane, methyldimethoxysilane or phenyldimethoxysilane; an acyloxysilane such as methyldiacetoxysilane or phenyldiacetoxysilane; a ketoxymatesilane such as bis(dimethylketoxymate)methylsilane or bis(cyclohexylketoxymate)methylsilane; and the like, but are not limited thereto. Halogenated silanes and alkoxylsilanes are preferable, and alkoxysilanes are particularly preferable since the hydrolyzability of the obtained curable compositions is moderate and they are easy to handle.

The method (b) is, for instance, a method wherein a compound having a mercapto group and a reactive silicon-containing group is introduced into the sites of unsaturated bonds of the organic polymer by radical addition reaction in the presence of a radical initiator and/or a radical-generating source. The method (b) is not limited to this method. Examples of the compound having mercapto group and reactive silicon-containing group are, for instance, γ-mercaptopropyltrimethoxysilane, γ-mercaptopropylmethyldimethoxysilane, γ-mercaptopropyltriethoxysilane, γ-mercaptopropylmethyldiethoxysilane, and the like, but are not limited thereto.

Of the methods (c), a method by a reaction of a polymer having a terminal hydroxyl group with a compound having both an isocyanate group and a reactive silicon-containing group is disclosed for example in JP-A-3-47825. The methods (c) are not limited to such a method. Examples of the compound having both an isocyanate group and a reactive silicon-containing group are, for instance, γ-isocyanatepropyltrimethoxysilane, γ-isocyanatepropylmethyldimethoxysilane, γ-isocyanatepropyltriethoxysilane, γ-isocyanatepropylmethyldiethoxysilane, and the like, but are not limited thereto.

The organic polymer (A) having reactive silicon-containing group may be linear or branched, and has a number average molecular weight of about 500 to about 50,000, preferably 1,000 to 30,000, in terms of polystyrene measured by GPC. If the number average molecular weight is less than 500, cured products obtained from the curable composition tend to have an insufficient flexibility and are inferior in elongation, and if it is more than 50,000, the curable composition tends to be inferior in workability because of high viscosity.

The reactive silicon-containing group or groups may be located at the end of the molecular chain of the organic polymer, or at the inside of the molecular chain of the organic polymer, or at both the end and the inside of the molecular chain. In particular, it is preferable that the reactive silicon-containing groups are present only at the molecular chain ends, from the viewpoint that since the length of a chain constituting a network (chain length between the crosslinking sites) of the organic polymer component included in the final cured product becomes large, a rubbery cured product having a high strength and a high elongation is easy to be obtained.

The polyoxyalkylene polymer which is preferred as the main chain skeleton of the organic polymer (A), consists essentially of repeating units of the formula (3):

$$-R^3-O- \qquad (3)$$

wherein $R^3$ is a linear or branched alkylene group having 1 to 14 carbon atoms. The polyoxyalkylene polymer may contain at most 30% by weight, preferably at most 10% by weight, of monomer units other than the recurring units (3). The group $R^3$ in the formula (3) is preferably a branched alkylene group, and is also preferably an alkylene group having 2 to 4 carbon atoms. Examples of the repeating unit (3) are, for instance,

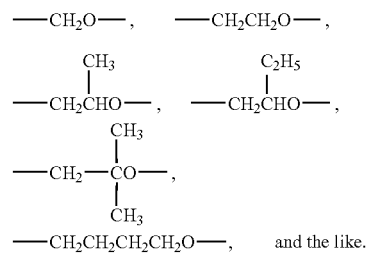

and the like.

The main chain skeleton of the polyoxyalkylene polymer may comprises repeating units (3) of only single kind, or repeating units (3) of two or more kinds. In particular, when the curable composition is used as a sealant, a polymer comprising polypropylene oxide as a main component is preferred from the viewpoints of being amorphous and having a relatively low viscosity.

The polyoxyalkylene polymer can be prepared, for instance, by a polymerization method using an alkali catalyst such as KOH, a polymerization method using a transition metal compound-porphyrin complex catalyst, e.g., a complex prepared by reacting an organoaluminum compound and porphyrin as disclosed in JP-A-61-215623, a polymerization method using a composite metal cyanide complex catalyst as disclosed in JP-A-46-27250, JP-B-59-15336, U.S. Pat. Nos. 3,278,457, 3,278,458, 3,278,459, 3,427,256, 3,427,334 and 3,427,335, a polymerization method using a catalyst comprising a polyphosphazene salt as disclosed in JP-A-10-273512, a polymerization method using a catalyst comprising a phosphazene compound as disclosed in JP-A-11-060722, and other known methods.

Polyoxyalkylene polymers having a reactive silicon-containing group can be prepared, for instance, by methods proposed in JP-A-45-36319, JP-A-46-12154, JP-A-50-156599, JP-A-54-6096, JP-A-55-13767, JP-A-55-13468, JP-A-57-164123, JP-B-3-2450, U.S. Pat. Nos. 3,632,557, 4,345,053, 4,366,307 and 4,960,844, methods for preparing those having a high molecular weight, e.g., a number average molecular weight of at least 6,000, and a narrow molecular weight distribution, e.g., a Mw/Mn ratio of at most 1.6, as proposed in JP-A-61-197631, JP-A-61-215622, JP-A-61-215623, JP-A-61-218632, JP-A-3-72527, JP-A-3-47825 and JP-A-8-231707, and other known methods.

The polyoxyalkylene polymers having a reactive silicon-containing group may be used alone or in admixture thereof.

The saturated hydrocarbon polymer which is preferred as the main chain skeleton of the organic polymer (A), is a polymer containing substantially no carbon-carbon unsaturated bond other than aromatic ring. Polymers constituting the skeleton of the saturated hydrocarbon polymer can be prepared, for instance, by polymerizing, as a main component, an olefin compound having 1 to 6 carbon atoms such as ethylene, propylene, 1-butene or isobutylene, or by homopolymerizing or copolymerizing a diene compound such as butadiene or isoprene with the olefin compound mentioned above, followed by hydrogenation. Isobutylene polymers and hydrogenated butadiene polymers are preferable, since it is easy to introduce functional groups into polymer chain ends and to control the molecular weight and since it is possible to increase the number of terminal functional groups. Isobutylene polymers are particularly preferable from the viewpoint of easiness in synthesis.

The organic polymer (A) the main chain skeleton of which is a saturated hydrocarbon polymer has the advantages of being superior in heat resistance, weatherability, durability and moisture barrier property.

Isobutylene polymers may be homopolymer of isobutylene or copolymers of isobutylene and other monomers, but from the viewpoints of rubber properties are preferred those having at least 50% by weight, especially at least 80% by weight, more especially 90 to 99% by weight, of isobutylene repeating units.

Various methods for the synthesis of saturated hydrocarbon polymers have hitherto been reported, and recently many so-called living polymerization methods have been developed. Saturated hydrocarbon polymers, particularly isobutylene polymers, can be easily prepared by inifer polymerization as reported by J. P. Kennedy et al., J. Polymer Sci., Polymer Chem. Ed., Vol. 15, 2843(1997), and it is known that polymers having a molecular weight of about 500 to about 100,000 and a molecular weight distribution of not more than 1.5 can be obtained thereby and various functional groups can be introduced into the molecular chain ends.

Saturated hydrocarbon polymers having a reactive silicon-containing group can be prepared, for instance, by methods disclosed in JP-B-4-69659, JP-B-7-108928, JP-A-63-254149, JP-A-64-22904, JP-A-1-197509, JP-B-2539445, JP-B-2873395, and JP-A-7-53882, but the methods are not limited thereto.

The saturated hydrocarbon polymers having a reactive silicon-containing group may be used alone or in admixture thereof.

Organic polymers (A) the main chain skeleton of which is a (meth)acrylic ester polymer may be used alone or may be used, as a secondary component (A), in combination with other organic polymers (A), preferably polyoxyalkylene polymer (A).

The (meth)acrylic ester monomers which constitute the main chain skeleton of the (meth)acrylic ester polymers are not particularly limited, and various monomers can be used. Examples of the (meth)acrylic monomers used in the preparation of organic polymer (A) the main chain skeleton of which is a (meth)acrylic ester polymer, are methacrylic ester monomers such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, γ-methacryloyloxypropyltrimethoxysilane, polyethylene glycol (meth)acrylate, trifluoromethylmethyl (meth)acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylmethyl (meth)acrylate, 2-perfluorohexylethyl (meth)acrylate, 2-perfluorodecylethyl (meth)acrylate and 2-perfluorohexadecylethyl (meth)acrylate, and (meth)acrylic acid. These monomers may be used alone or in admixture thereof. The (meth)acrylic esters and (meth)acrylic acids may be homopolymerized or copolymerized with other vinyl monomers. Examples of the other vinyl monomers are, for instance, a styrenic monomer such as styrene, vinyltoluene, α-methylstyrene, chlorostyrene, styrenesulfonic acid and its salts; a fluorine-containing vinyl monomer such as perfluoroethylene, perfluoropropylene or vinylidene fluoride; a silicon-containing vinyl monomer such as vinyltrimethoxysilane or vinyltriethoxysilane; maleic anhydride, maleic acid, a monoalkyl or dialkyl maleate; fumaric anhydride, fumaric acid, a monoalkyl or dialkyl fumarate; a maleimide monomer such as maleimide, methylmaleimide, ethylmaleimide, propylmaleimide, butylmaleimide, hexylmaleimide, octylmaleimide, dodecylmaleimide, stearylmaleimide, phenylmaleimide or cylohexylmaleimide; a nitrile group-containing vinyl monomer such as acrylonitrile or methacrylonitrile; an amido group-containing vinyl monomer such as acrylamide, methacrylamide, N-methylolacrylamide or. N-methylolmethacrylamide; an epoxy group-containing vinyl monomer such as glycidyl (meth)acrylate; an amino group-containing vinyl monomer such as aminoethyl vinyl ether; a vinyl ester such as vinyl acetate, vinyl propionate, vinyl pivalate, vinyl benzoate or vinyl cinnamate; an alkene such as ethylene or propylene; a conjugated diene such as butadiene or isoprene; vinyl chloride; vinylidene chloride; allyl chloride; allyl alcohol; and the like. These comonomers may be used alone or in admixture thereof.

The (meth)acrylic ester polymers having a reactive silicon-containing group may be used alone or in admixture thereof.

The method for preparing the (meth)acrylic ester polymers is not particularly limited, and known methods are applicable. However, polymers prepared by conventional free radical polymerization using an azo compound or a peroxide as a polymerization initiator have in general a wide molecular weight distribution of 2 or more and therefore have a problem that the viscosity becomes high. Therefore, when it is desired to obtain (meth)acrylic ester polymers having a narrow molecular weight distribution, thus having a low viscosity, and having a crosslinkable functional group introduced to the chain ends in a high ratio, living radical polymerization methods are preferable.

Of the living radical polymerization methods, atom transfer radical polymerization method wherein (meth)acrylic ester monomers are polymerized using an organic halide or a halogenated sulfonyl compound as an initiator and a transition metal complex as a catalyst, is more preferred as a method for preparing (meth)acrylic ester copolymers having a specific functional group from the viewpoints that, in addition to the characteristics of the above-mentioned living radical polymerization methods, the products have at the chain end a halogen or the like relatively advantageous to functional group conversion reaction and the degree of freedom in designing the initiator and catalyst is large. The atom transfer radical polymerization method is known for instance from Matyjaszewski et al, J. Am. Chem. Soc., Vol. 117, 5614(1995).

As methods for preparing (meth)acrylic ester polymers having a reactive silicon-containing group, a method by free radical polymerization using a chain transfer agent is disclosed, for instance, in JP-B-3-14068, JP-B-4-55444 and JP-A-6-211922, and a method by atom transfer radical polymerization is disclosed, for instance, in JP-A-9-272714, but the methods are not limited thereto.

The organic polymers (A) having a reactive silicon-containing group may be used alone or in combination thereof. In case of combination use, preferably used are blends of at least two polymers selected from the group consisting of a polyoxyalkylene polymer having a reactive silicon-containing group, a saturated hydrocarbon polymer having a reactive silicon-containing group and a (meth) acrylic ester polymer having a reactive silicon-containing group. These polymers can be blended in any proportion. Blends containing a (meth)acrylic ester polymer having a reactive silicon-containing group as a secondary component (A) are particularly preferable from the viewpoint of weatherability, and blends of a polyoxyalkylene polymer having a reactive silicon-containing group and a (meth)acrylic ester polymer having a reactive silicon-containing group are the most preferable from the viewpoint of compatibility. The content of the secondary component (A), i.e., (meth)acrylic ester polymer having reactive silicon-containing group, in the blends is from 1 to 99% by weight.

A method for preparing an organic polymer comprising the blend of polyoxyalkylene polymer having reactive silicon-containing group and (meth)acrylic ester polymer having reactive silicon-containing group is disclosed, for instance, in JP-A-59-122541, JP-A-63-112642, JP-A-6-172631 and JP-A-11-116763, but is not limited thereto.

A method for preparing an organic polymer comprising the blend of saturated hydrocarbon polymer having reactive silicon-containing group and (meth)acrylic ester polymer having reactive silicon-containing group is disclosed, for instance, in JP-A-1-168764 and JP-A-2000-186176, but is not limited thereto.

Besides, organic polymers comprising blends containing the (meth)acrylic ester polymer having reactive silicon-containing group can also be prepared by polymerizing an (meth)acrylic ester monomer in the presence of an organic polymer having a reactive silicon-containing group. This method is disclosed, for instance, in JP-A-59-78223, JP-A-59-168014, JP-A-60-228516 and JP-A-60-228517, but is not limited thereto.

The component (B) in the present invention is a block copolymer having one soft segment and at least one hard segment in a molecule, which is generally recognized as a thermoplastic elastomer.

The hard segment of the block copolymer (B) has structural units of an aromatic vinyl monomer. Examples of the aromatic vinyl monomer are, for instance, styrene, o-, m- or p-methylstyrene, α-methylstyrene, β-methylstyrene, 2,6-dimethylstyrene, 2,4-dimethylstyrene, α-methyl-o-methylstyrene, α-methyl-m-methylstyrene, α-methyl-p-methylstyrene, β-methyl-o-methylstyrene, β-methyl-m-methylstyrene, β-methyl-p-methylstyrene, 2,4,6-trimethylstyrene, β-methyl-2,6-dimethylstyrene, α-methyl-2,4-dimethylstyrene, β-methyl-2,6-dimethylstyrene, β-methyl-2,4-dimethylstyrene, o-, m- or p-chlorostyrene, 2,6-dichlorostyrene, 2,4-dichlorostyrene, α-chloro-o-chlorostyrene, α-chloro-m-chlorostyrene, α-chloro-p-chlorostyrene, β-chloro-o-chlorostyrene, β-chloro-m-chlorostyrene, β-chloro-p-chlorostyrene, 2,4,6-trichlorostyrene, α-chloro-2,6-dichlorostyrene, α-chloro-2,4-dichlorostyrene, β-chloro-2,6-dichlorostyrene, β-chloro-2,4-dichlorostyrene, o-, m- or p-t-butylstyrene, o-, m- or p-methoxystyrene, o-, m- or p-chloromethylstyrene, o-, m- or p-bromomethylstyrene, styrene derivatives substituted by silyl group, indene, vinylnaphthalene, and the like. These may be used alone or in admixture thereof.

At least one monomer selected from the group consisting of styrene, α-methylstyrene and indene is preferably used as an aromatic vinyl monomer for the component (B) from the viewpoint of availability. In particular, styrene, α-methylstyrene or a mixture thereof is preferred from an economical point of view.

A representative hard segment in the block copolymer (B) is a styrene polymer.

Besides the hard segment mentioned above, the block copolymer (B) has one soft segment. Examples of the soft segment are, for instance, a conjugated diene polymer such as polybutadiene or polyisoprene, a polyolefin elastomer such as ethylene-butylene copolymer, ethylene-propylene copolymer or polyisobutene, and the like.

The block copolymer which is composed of a soft segment and two hard segments of a styrene polymer bonded to the both ends of the soft segment includes, for instance, SBS block copolymer (styrene-butadiene-styrene block copolymer), SIS block copolymer (styrene-isoprene-styrene block copolymer), SEBS block copolymer (styrene-ethylenebutylene-styrene block copolymer), SEPS block copolymer (styrene-ethylenepropylene-styrene block copolymer), SIBS block copolymer (styrene-isobutene-styrene block copolymer), and the like. In particular, styrene block copolymers containing a saturated hydrocarbon segment are preferable from the viewpoints of heat resistance and weatherability. SEBS block copolymer, SEPS block copolymer and SIBS block copolymer are more preferable from the viewpoint of availability.

The number of hard segments included in the block copolymer (B) is one or more. In case of a single hard segment, the hard segment is present at one end of a linear soft segment, and such block copolymers are called block copolymers of diblock type. In case of two hard segments, the hard segments are present at both ends of a linear soft segment, and such block copolymers are called block copolymers of linear type. In case of three or four hard segments, a soft segment is branched and the hard segments are present at the ends of three or four branches, and such block copolymers are called block copolymers of radial type. Block copolymers wherein five or more hard segments are present at five or more ends of a soft segment, are called block copolymers of star type.

In the present invention, any of diblock type, linear type, radial type and star type block copolymers can be used as the component (B). Diblock type, linear type and radial type block copolymers are preferred from the viewpoints of compatibility and adhesive property. That is to say, the number of hard segments per molecule included in the block copolymer (B) is preferably not less than 1 and not more than 4.

The block copolymer (B) can be prepared by generally known methods.

The amount of the block copolymer (B) is preferably from 2 to 50 parts by weight, more preferably 2 to 40 parts by weight, the most preferably 5 to 30 parts by weight, per 100 parts by weight of the organic polymer (A). The amount of the block copolymer (B) is too small, there is a case where the effect on adhesive property to be produced by the present invention is not obtained. If the amount is too large, there is a possibility that the viscosity of a curable composition rises or the curing of the component (A) is impaired.

The block copolymer (B) can be directly mixed with the organic polymer (A) to give curable compositions according to the present invention, but there is a possibility that the compositions become highly viscous, so stirring is difficult, since the block copolymer (B) is in general a solid. For the reason, preferably the component (B) is once dissolved in component (C) selected from a plasticizer and an organic solvent to give a solution, and the solution is mixed with the component (A). The dissolution of component (B) may be conducted under heating.

The plasticizer used as the component (C) is not limited so long as it meets the objects of the present invention. Examples of the plasticizer used as the component (C) are, for instance, an oligomer of polyvinyl type such as polybutene, hydrogenated polybutene, hydrogenated α-olefin oligomer or atactic polypropylene; an aromatic oligomer such as biphenyl or triphenyl, and its complete or partial hydrogenation products; a hydrogenated polyene oligomer such as hydrogenated liquid polybutadiene; a paraffin such as paraffin oil or chlorinated paraffin; a cycloparaffin such as naphthene oil; a phthalic acid ester such as dibutyl phthalate, diheptyl phthalate, di(2-ethylhexyl) phthalate, butylbenzyl phthalate, di-n-octyl phthalate, diisononyl phthalate, diisodecyl phthalate or diundecyl phthalate; a non-aromatic dibasic acid ester such as di(2-ethylhexyl) adipate, di-n-octyl adipate, diisononyl adipate, diisodecyl adipate, di(2-ethylhexyl) sebacate or di-2-ethylhexyl tetrahydrophthalate; an aromatic ester such as tri-2-ethylhexyl trimellitate or triisodecyl trimellitate; a fatty acid ester such as butyl oleate, methyl acetylrecinolate or pentaerythritol ester; a polyalkylene glycol ester such as diethylene glycol benzoate or triethylene glycol dibenzoate; a phosphoric acid ester such as tricresyl phosphate or tributyl phosphate; an epoxy plasticizer such as epoxidated soybean oil or epoxidated linseed oil; an alkylsulphonic phenyl ester such as Mesamoll or Mesamoll II (trade mark, product of Bayer AG); and the like. These may be used alone or in admixture thereof.

The amount of the plasticizer (C) is usually from 1 to 100 parts by weight, preferably 5 to 70 parts by weight, per 100 parts by weight of the total of the components (A) and (B).

As the organic solvent used as the component (C) are preferred aliphatic and aromatic hydrocarbon solvents. Examples of the hydrocarbon solvents are, for instance, toluene, xylene and other aromatic hydrocarbon solvents, hexane, heptane, cyclohexane, decane and other aliphatic hydrocarbon solvents. The amount of the organic solvent (C) is usually from 0.1 to 50 parts by weight, preferably 1 to 30 parts by weight, per 100 parts by weight of the total of the components (A) and (B).

The thus prepared curable composition of the present invention consequently may contain a plasticizer or an organic solvent as a component (C) in addition to the components (A) and (B). The amount of the component (C) varies depending on the kinds of the components (A) and (B) and so on, but it should be used in an amount at least sufficient to dissolve the component (B).

The block copolymer (B) used in the present invention is also available from the market. Examples of the commercially available block copolymers are, for instance, KRATON Polymer D 1184 (trade mark, styrene-butadiene-styrene block copolymer made by KRATON Polymers), KRATON Polymer G1652 (trade mark, styrene-ethylene/butylene-styrene block copolymer made by KRATON Polymers), KRATON Polymer G1654 (trade mark, styrene-ethylene/butylene-styrene block copolymer made by KRATON Polymers), KRATON Polymer G1701 (trade mark, styrene-ethylene/propylene-styrene block copolymer made by KRATON Polymers), and the like. These KRATON polymers are mixed with the organic polymer (A) having a reactive silicon-containing group and optionally other additives usually after dissolving in a plasticizer up to the saturation. The amount of the plasticizer used as the component (C) for dissolution varies depending on the kinds of Kraton polymer and plasticizer, but is usually from 20 to 50 parts by weight per 10 parts by weight of the Kraton polymer. Preferably the Kraton polymer is used in an amount of 5 to 30 parts by weight per 100 parts by weight of the organic polymer (A).

The curable composition of the present invention may further contain a curing catalyst which accelerates the reaction of the reactive silicon-containing group. Any of compounds known as a curing catalyst for compounds having reactive silicon-containing group can be used as the curing catalyst. Examples of the curing catalyst are, for instance, a titanium compound such as tetrabutyl titanate, tetrapropyl titanate or tetrakisacetylacetonatotitanate; a tetravalent tin compound such as dibutyl tin dilaurate, dibutyl tin dimaleate, dibutyl tin diphthalate, dibutyl tin dioctoate, dibutyl tin diethylhexanoate, dibutyl tin dimethylmaleate, dibutyl tin diethylmaleate, dibutyl tin dibutylmaleate, dibutyl tin dioctylmaleate, dibutyl tin ditridecylmaleate, dibutyl tin dibenzylmaleate, dibutyl tin diacetate, dioctyl tin diethylmaleate, dioctyl tin dioctylmaleate, dibutyl tin dimethoxide, dibutyl tin dinonylphenoxide, dibutenyl tin oxide, dibutyl tin diacetylacetonate, dibutyl tin diethylacetoacetonate or a reaction product of dibutyl tin oxide and phthalic acid ester; a bivalent tin compound such as tin octylate, tin salt of Versatics, tin naphthenate or tin stearate; an organoaluminum compound such as aluminum tris(acetylacetonate), aluminum tris(ethylacetoacetate) or diisopropoxy aluminum ethylacetoacetate; a zirconium compound such as zirconium tetraacetylacetonate; lead octylate; an amine compound such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 2-ethyl-4-methylimidazole or 1,8-diazabicyclo(5,4,0)undecene-7 (DBU), and salts of these amine compounds with carboxylic acids; a low molecular weight polyamide resin obtained from excess polyamine and polybasic acid; a reaction product of excess polyamine and epoxy compound; a silanol condensation catalyst, e.g., an amino group-containing silane coupling agent such as γ-aminopropyltrimethoxysilane or N-(β-aminoethyl)aminopropylmethyldimethoxysilane, and other known silanol condensation catalysts such as acidic catalysts and basic catalysts; and the like. The catalysts may be used alone or in admixture thereof.

The amount of the curing catalyst is preferably from about 0.01 to about 20 parts by weight, preferably about 0.1 to about 10 parts by weight, per 100 parts by weight of the component (A). If the amount of the curing catalyst is too small, the curing rate is slow and also the curing reaction is hard to sufficiently proceed. If the amount of the catalyst is too large, heat generation or foaming locally occurs at the time of curing, so good cured product is not obtained.

Besides the components (A) to (C) mentioned above, the curable composition of the present invention may optionally contain a tackifier, a filler, an antioxidant, a silane coupling agent, a plasticizer added apart from the component (C) for dissolution, an antisag agent, and other additives.

These additives can be added in any stage of the steps for preparing the curable composition of the invention so long as the desired composition can be prepared and the desired properties can be exhibited. For example, the additives may be added at the time of preparing the component (A), or may be added after mixing the components (A) and (B).

Examples of the tackifier are, for instance, aliphatic hydrocarbon resins, aromatic hydrocarbon resins, hydrogenated alicyclic hydrocarbon resins, alicyclic hydrocarbon resins, coumarone resin, terpene resin, rosin derivatives, and the like. The amount of the tackifier is from 1 to 300 parts by weight, preferably 5 to 100 parts by weight, per 100 parts by weight of the total of the components (A) and (B).

Examples of the filler are, for instance, wood flour, pulp, cotton chip, asbestos, glass fiber, carbon fiber, mica, walnut shell powder, chaff powder, graphite, diatomaceous earth, China clay, fumed silica, precipitated silica, silicic anhydride, carbon black, calcium carbonate, magnesium carbonate, clay, talc, a metal oxide such as titanium oxide, quartz, aluminum fine powder, flint powder, zinc powder, polyethylene, polypropylene, HI polystyrene, cyclized rubber, coumarone-indene resin, phenol-formaldehyde resin, modified melamine resin, petroleum resin, styrene copolymer, lignin resin, and the like. Of these fillers, precipitated silica, humed silica, carbon black, calcium carbonate, titanium oxide and talc are preferred. The fillers may be used alone or in admixture thereof.

Also, weight reduction can be attempted by incorporating an inorganic hollow filler such as glass balloon or silica balloon or an organic hollow filler such as hollow filler made of polyvinylidene fluoride.

For the purpose of weight reduction or impact absorption, it is also possible to incorporate various types of blowing agents into the curable composition, or to mechanically mix a gas into the curable composition at the time of mixing components.

The amount of the filler is from 1 to 500 parts by weight, preferably 5 to 200 parts by weight, per 100 parts by weight of the total of the components (A) and (B).

The antioxidant includes, for instance, a phenol antioxidant, an aromatic amine antioxidant, a sulfur-based antioxidant, a phosphorus-based antioxidant, a benzotriazole ultraviolet absorber, a salicylate ultraviolet absorber, a benzoate ultraviolet absorber, a benzophenone ultraviolet absorber, a hindered amine light stabilizer, a nickel-based light stabilizer, and the like. The amount of the antioxidant is from 0.01 to 20 parts by weight, preferably 0.1 to 10 parts by weight, per 100 parts by weight of the total of the components (A) and (B).

Examples of the phenol antioxidant are, for instance, 2,6-di-t-butylphenol, 2,4-di-t-butylphenol, 2,6-di-t-butyl-4-methylphenol, 2,5-di-t-butylhydroquinone, n-octadecyl 3-(3,5-di-t-butyl-4-hydroxyphenyl)-propionate, pentaerythrityl tetrakis[3-(3,5-di-t-butyl-4-hydroxyphenyl)-propionate], 2,2'-methylenebis(4-methyl-6-t-butylphenol), 4,4'-butylidenebis(3-methyl-6-t-butylphenol), 4,4'-thiobis(3-methyl-6-t-butylphenol), and the like.

Examples of the aromatic amine antioxidant are, for instance, N,N'-diphenyl-p-phenylenediamine, 6-ethoxy-2,2,4-trimethyl-1,2-dihydroquinoline, and the like.

Examples of the sulfur-based antioxidant are, for instance, dilauryl 3,3'-thiodipropionate, ditridecyl 3,3'-thiodipropionate, distearyl 3,3'-thiodipropionate, and the like.

Examples of the phosphorus-based antioxidant are, for instance, diphenylisooctyl phosphite, triphenyl phosphite, and the like.

Examples of the benzotriazole ultraviolet absorber are, for instance, 2-(3,5-di-t-butyl-2-hydroxyphenyl)-5-chlorobenzotriazole, 2-(3-t-butyl-5-methyl-2-hydroxyphenyl)-5-chlorobenzotriazole, 2-(3,5-di-t-butyl-2-hydroxyphenyl)benzotriazole, 2-(5-methyl-2-hydroxyphenyl)-benzotriazole, and the like.

Examples of the salicylate ultraviolet absorber are, for instance, 4-t-butylphenylsalicylate, and the like.

Examples of the benzoate ultraviolet absorber are, for instance, 2,4-di-t-butylphenyl-3,5-di-t-butyl-4-hydroxybenzoate, and the like.

Examples of the benzophenone ultraviolet absorber are, for instance, 2,4-dihydroxybenzophenone, 2-hydroxy-4-methoxybenzophenone, 2-hydroxy-4-n-octoxybenzophenone, 2-hydroxy-4-n-dodecyloxybenzophenone, 2-hydroxy-4-benzyloxybenzophenone, and the like.

Examples of the hindered amine light stabilizer are, for instance, bis(2,2,6,6-tetramethyl-4-piperidyl) sebacate, bis (1,2,2,6,6-pentamethyl-4-piperidyl) sebacate, 1-{2-[3-(3,5-di-t-butyl-4-hydroxyphenyl) propionyloxy]ethyl}-4-[3-(3,5-di-t-butyl-4-hydroxyphenyl) propionyloxy]-2,2,6,6-tetramethylpiperidine, 4-benzoyloxy-2,2,6,6-tetramethylpiperidine, and the like.

Examples of the nickel-based light stabilizer are, for instance, nickel dibutyldithiocarbamate, [2,2'-thiobis(4-t-octylphenolate)]-2-ethylhexylamine nickel (II), [2,2'-thiobis (4-t-octylphenolate)]-n-butylamine nickel (II), and the like.

The antioxidants may be used alone or in admixture thereof. Some combinations of the antioxidants may enhance the effect as compared with single use thereof.

Examples of the silane coupling agent are, for instance, an amino group-containing silane such as γ-aminopropyltrimethoxysilane, γ-aminopropyltriethoxysilane, γ-aminopropylmethyldimethoxysilane, γ-aminopropylmethyldiethoxysilane, γ-(2-aminoethyl)aminopropyltrimethoxysilane, γ-(2-aminoethyl)aminopropylmethyldimethoxysilane, (2-aminoethyl) aminopropyltriethoxysilane, γ-(2-aminoethyl)-aminopropylmethyldiethoxysilane, γ-ureidopropyltrimethoxysilane, N-phenyl-γ-aminopropyltrimethoxysilane, N-benzyl-γ-aminopropyl-trimethoxysilane or N-vinylbenzyl-γ-aminopropyltriethoxysilane; a mercapto group-containing silane such as γ-mercaptopropyltrimethoxysilane, γ-mercaptopropyltriethoxysilane, γ-mercaptopropylmethyldimethoxysilane or γ-mercaptopropylmethyldiethoxysilane; an epoxy group-containing silane such as γ-glycidoxypropyltrimethoxysilane, γ-glycidoxypropyltriethoxysilane, γ-glycidoxypropylmethyldimethoxysilane, β-(3,4-epoxycyclohexyl)ethyltrimethoxysilane or β-(3,4-epoxycyclohexyl)ethyltriethoxysilane; a carboxysilane such as β-carboxyethyltriethoxysilane, β-carboxyethylphenylbis(2-methoxyethoxy)silane, or N-β-(carboxymethyl)aminoethyl-γ-aminopropyltrimethoxysilane; a ethylenically unsaturated group-containing silane such as vinyltrimethoxysilane, vinyltriethoxysilane, γ-methacyloyloxypropylmethyldimethoxysilane, or γ-acryloyloxypropylmethyltriethoxysilane; a halogen-containing silane such as γ-chloropropyltrimethoxysilane; an isocyanuratesilane such as tris(trimethoxysilyl)isocyanurate; an isocyanate group-containing silane such as γ-isocyanatopropyltrimethoxysilane, γ-isocyanatopropyltriethoxysilane, γ-isocyanatopropylmethyldiethoxysilane, γ-isocyanatopropylmethyldimethoxysilane; and the like. Derivatives thereof obtained by modifying the silane compounds exemplified above can also be used as the silane coupling agent, e.g., amino-modified silylpolymer, silylated aminopolymer, unsaturated aminosilane complex, blocked isocyanate silane, phenylamino-long chain alkylsilane, aminosilylated silicone and silylated polyester. The silane coupling agents may be used alone or in admixture thereof.

The amount of the silane coupling agent is from 0.1 to 20 parts by weight, preferably 0.5 to 10 parts by weight, per 100 parts by weight of the component (A).

The curable composition of the present invention can be incorporated with adhesion promoters other than the silane coupling agent.

Examples of the plasticizer used for the purpose other than dissolution of the component (B) are, for instance, a phthalic acid ester such as dibutyl phthalate, diheptyl phthalate, di(2-ethylhexyl) phthalate, butylbenzyl phthalate or butylphthalylbutyl glycolate; a non-aromatic dibasic acid ester such as dioctyl adipate or dioctyl sebacate; a phosphoric acid ester such as tricresyl phosphate or tributyl phosphate; a hydrocarbon plasticizer such as polybutene, polybutadiene or non-reactive polyisobutylene; an alkylsulfonic phenyl ester such as Mesamoll and Mesamoll II (products of Bayer AG); plasticizers of relatively high molecular weight type, e.g., a polyester plasticizer such as a polyester of a dibasic acid and a dihydric alcohol, a polyether plasticizer such as polypropylene glycol or its derivatives, a polystyrene plasticizer such as polystyrene or poly-α-methylstyrene, a process oil, an alkylbenzene plasticizer and a trimellitate plasticizer; and the like. The plasticizers may be used alone or in admixture thereof.

Examples of the antisag agent are, for instance, hydrogenated castor oil, organic amide wax, organic bentonite, calcium stearate, and the like. These thixotropic agents may be used alone or in admixture thereof.

The curable compositions of the present invention have an improved adhesive property to concrete and are useful as a sealing material for building and an adhesive which are applied to concrete. Further, the curable compositions of the present invention have an improved adhesive property to substrates such as fluorohydrocarbon resin coat, EPDM rubber, vinyl chloride resin sheet and acrylic substrate.

The present invention is more specifically described and explained by means of the following Examples in which all % and parts are by weight unless otherwise noted. It is to be understood that the present invention is not limited to these Examples.

EXAMPLES 1 to 6 and COMPARATIVE EXAMPLE 1

Synthesis of Organic Polymer Having Reactive Silicon-Containing Group

An autoclave equipped with a stirrer was charged with 800 g of polyoxypropylene having an allyl ether group at the molecular end and having an average molecular weight of 16,000 in terms of polystyrene. Thereto was then added $1 \times 10^{-4}$ equivalent/vinyl group of chloroplatinic acid catalyst (chloroplatinic acid hexahydrate). After adding 1.1 equivalent/vinyl group of methyldimethoxysilane to the autoclave, the reaction was conducted at 90° C. for 2 hours. The thus obtained polymer is hereinafter referred to as polymer A.

Preparation of Curable Composition

Ingredients were kneaded according to the recipe shown in Table 1 to give a one-package curable composition.

Evaluation of Adhesive Property

The adhesive property of the curable compositon was evaluated according to the following method.

The curable composition was applied in the form of beads (width about 1–2 cm and thickness less than 1 cm) to a concrete substrate (concrete substrate prescribed in ASTM C794), an EPDM rubber sheet for waterproof of roof, a PVC sheet for waterproof of roof, a Kynar-coated (fluorohydrocarbon resin-coated) steel plate for building and an acrylic resin board for building, and was aged for 7 days in an air-conditioned room at 23° C. and 50% RH. A cut was given between the cured composition and the substrate and the cured composition was peeled off from the substrate, and the state of adhesion was observed. The adhesive property was evaluated as good (○) when the cured composition was left on the substrate, and as bad (×) when the cured composition was not left on the substrate.

The results are shown in Table 1.

The curable compositions of the Examples have a good adhesion property to the above-mentioned substrates, but the curable composition of the Comparative Example shows a poor adhesive property.

The ingredients shown in Table 1 are as follows:

KRATON D 1184: Styrene-butadiene-styrene block copolymer made by KRATON Polymers KRATON G1654: Styrene-ethylene/butylene-styrene block copolymer made by KRATON Polymers KRATON G1701: Styrene-ethylene/propylene-styrene block copolymer made by KRATON Polymers KRATON G1654: Styrene-ethylene/butylene-styrene block copolymer made by KRATON Polymers HB40: Partially hydrogenated terphenyls plasticizer made by Solutia Inc.

LB285: Alkyleneoxide plasticizer made by Sanyo Chemical Industries, Ltd.

DIDP: Diisodecyl phthalate made by Ashland Chemical Co.

Ultrapflex (Precipitated): Precipitated calcium carbonate made by Specialty Minerals Inc.

G2T (Ground): Heavy calcium carbonate made by Huber Corporation

Ti-Pure R902: Titanium dioxide made by DuPont

Disparlon 6500: Amide wax made by Kusumoto Kasei Kabushiki Kaisha

Tinuvin 327: Ultraviolet absorber made by Ciba-Geigy

Tinuvin 770: Hindered amine light stabilizer (HALS) made by Ciba-Geigy

A-171: Vinyltrimethoxysilane made by Osi Specialties

A-1120: γ-(2-Aminoethyl)aminopropyltrimethoxysilane made by Osi Specialties

Heloxy 48: Trifunctional epoxy compound made by Shell

U-220H: Curing catalyst made by Kaneka Texas Corporation

TABLE 1

|  |  | Ex. 1 | Ex. 2 | Ex. 3 | Ex. 4 | Ex. 5 | Ex. 6 | Com. Ex. 1 |
|---|---|---|---|---|---|---|---|---|
| Composition (part) | | | | | | | | |
| Component (A) | Polymer A | 100 | 100 | 100 | 100 | 100 | 100 | 100 |
| Component (B) | KRATON D1184 polymer | 20 | — | — | — | — | — | — |
|  | KRATON G1654 polymer | — | 20 | — | — | 20 | — | — |
|  | KRATON G1701 polymer | — | — | 10 | — | — | 10 | — |
|  | KRATON G1652 polymer | — | — | — | 14 | — | — | — |

TABLE 1-continued

|  |  | Ex. 1 | Ex. 2 | Ex. 3 | Ex. 4 | Ex. 5 | Ex. 6 | Com. Ex. 1 |
|---|---|---|---|---|---|---|---|---|
| Plasticizer | LB285 | 60 | 60 | — | — | 40 | — | 60 |
|  | DIDP | — | — | 50 | 56 | — | 30 | — |
|  | HB40 | 60 | 80 | 30 | — | 60 | 30 | — |
| Calcium carbonate | Ultrapflex (precipitated) | 60 | 60 | 60 | 120 | 60 | 60 | 60 |
|  | G2T (ground) | 120 | 120 | 120 | — | 120 | 120 | 120 |
| Titanium dioxide | Ti-Pure R902 | 10 | 10 | 10 | 20 | 20 | 20 | 10 |
| Thixotropic agent | Disparlon 6500 | 4 | 4 | 6 | 2 | 2 | 2 | 4 |
| UV absorber | Tinuvin 327 | 1 | 1 | 1 | 1 | 1 | 1 | 1 |
| Light stabilizer | Tinuvin 770 | 1 | 1 | 1 | 1 | 1 | 1 | 1 |
| Dehydrating agent | A-171 | 1 | 1 | 1 | 2 | 1 | 2 | 1 |
| Adhesion promoter | A-1120 | 5 | 5 | 5 | 3 | 4 | 3 | 5 |
|  | Heloxy 48 | 2 | 2 | — | — | — | — | 2 |
| Curing catalyst | U-220H | 2 | 2 | 2 | 2 | 2 | 2 | 2 |
| Adhesive property |  |  |  |  |  |  |  |  |
| Substrates | Concrete | ○ | ○ | ○ | ○ | ○ | ○ | X |
|  | EPDM rubber | ○ | ○ | ○ | ○ | ○ | ○ | X |
|  | PVC sheet | ○ | ○ | ○ | ○ | ○ | ○ | X |
|  | Kynar coated steel plate | ○ | ○ | ○ | ○ | ○ | ○ | X |
|  | Acrylic resin board | ○ | ○ | ○ | ○ | ○ | ○ | X |

(Notes)
○: cohesive failure of sealant
X: interfacial failure

What we claim is:

1. A curable composition comprising:
   (A) an organic polymer having a main chain skeleton of a polyoxyalkylene polymer and having a reactive silicon-containing group introduced to said polyoxyalkylene polymer by reacting a polyoxyalkylene polymer having an unsaturated group with a hydrosilane having a reactive silicon-containing group, and
   (B) a block copolymer in an amount of 2 to 50 parts by weight per 100 parts by weight of said organic polymer (A), the block copolymer containing in its molecule one soft segment and at least one hard segment having structural units of an aromatic vinyl monomer.

2. The composition of claim 1, wherein the soft segment in said block copolymer (B) is at least one member selected from the group consisting of a polybutadiene, a polyisoprene, an ethylene-butylene copolymer, an ethylene-propylene copolymer and a polyisobutene.

3. The composition of claim 1, wherein the soft segment in said block copolymer (B) is at least one member selected from the group consisting of an ethylene-butylene copolymer, an ethylene-propylene copolymer and a polyisobutene.

4. The composition of claim 1, wherein the number of soft segments per molecule in said block copolymer (B) is from 1 to 4.

5. The composition of claim 1, which contains, as a component (C), a plasticizer or an organic solvent.

6. The composition of claim 5, wherein said plasticizer or solvent is an aromatic or aliphatic compound.

7. The composition of claim 1, wherein said polyoxyalkylene polymer is prepared by a polymerization method using a composite metal cyanide complex catalyst.

8. The composition of claim 1, wherein said polyoxyalkylene polymer has an Mw/Mn ratio of at most 1.6.

* * * * *

UNITED STATES PATENT AND TRADEMARK OFFICE
CERTIFICATE OF CORRECTION

PATENT NO.         : 7,019,074 B2                                          Page 1 of 1
APPLICATION NO. : 10/828180
DATED                 : March 28, 2006
INVENTOR(S)       : Nakamura et al.

It is certified that error appears in the above-identified patent and that said Letters Patent is hereby corrected as shown below:

| Column | Line | | |
|---|---|---|---|
| Title page, col. 1, | (73) | Change | "Corporaiton" |
| | | To | -Corporation-. |
| 1 | 40 | Change | "However, s sufficient" |
| | | To | -However, a sufficient-. |
| 13 | 23 | Change | "humed silica" |
| | | To | -fumed silica-. |

Signed and Sealed this

Eighth Day of August, 2006

JON W. DUDAS
*Director of the United States Patent and Trademark Office*